March 5, 1963 R. B. BLIZARD 3,080,010
ACOUSTIC WELL LOGGING APPARATUS
Filed Aug. 6, 1959 4 Sheets-Sheet 4

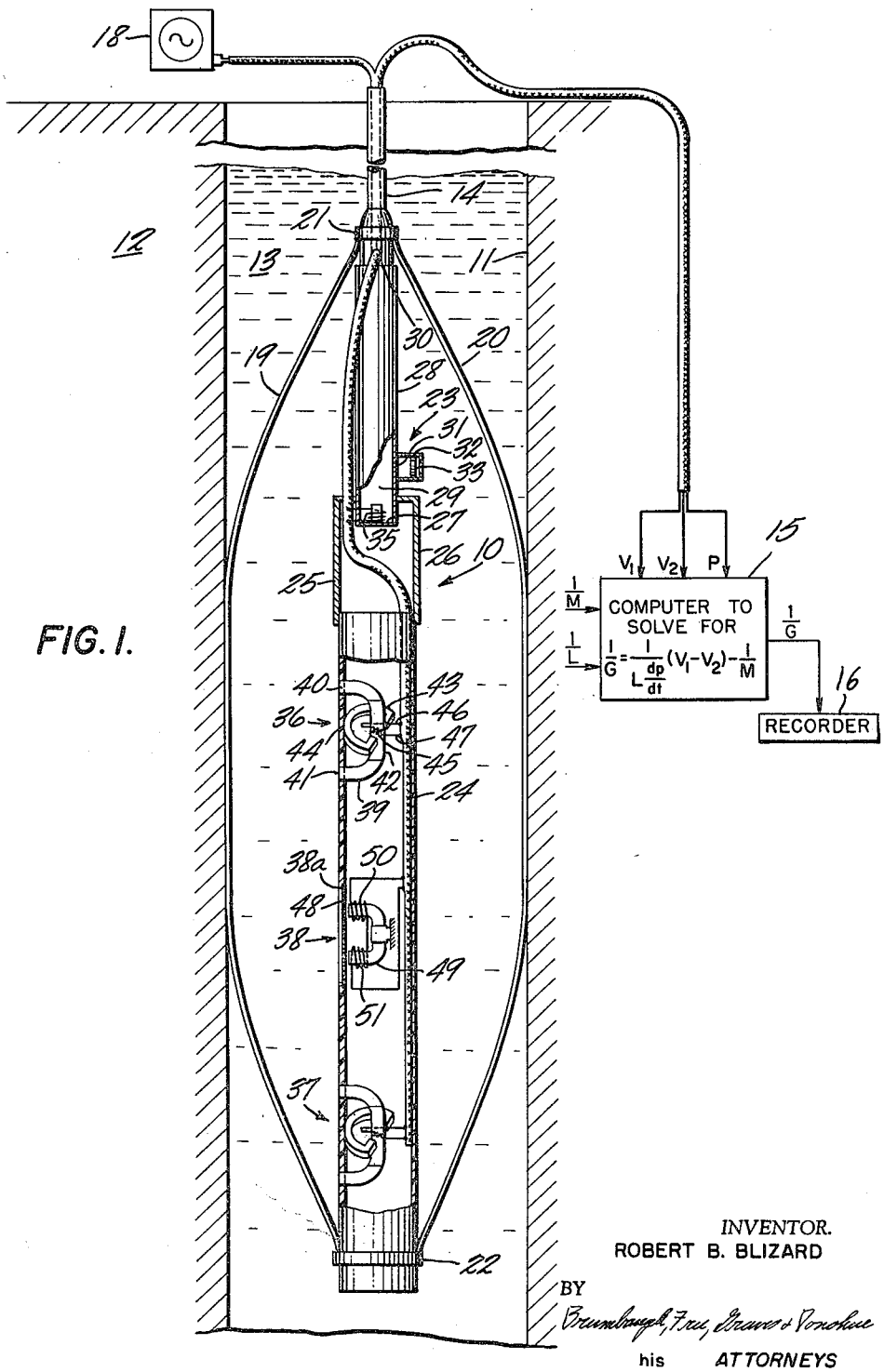

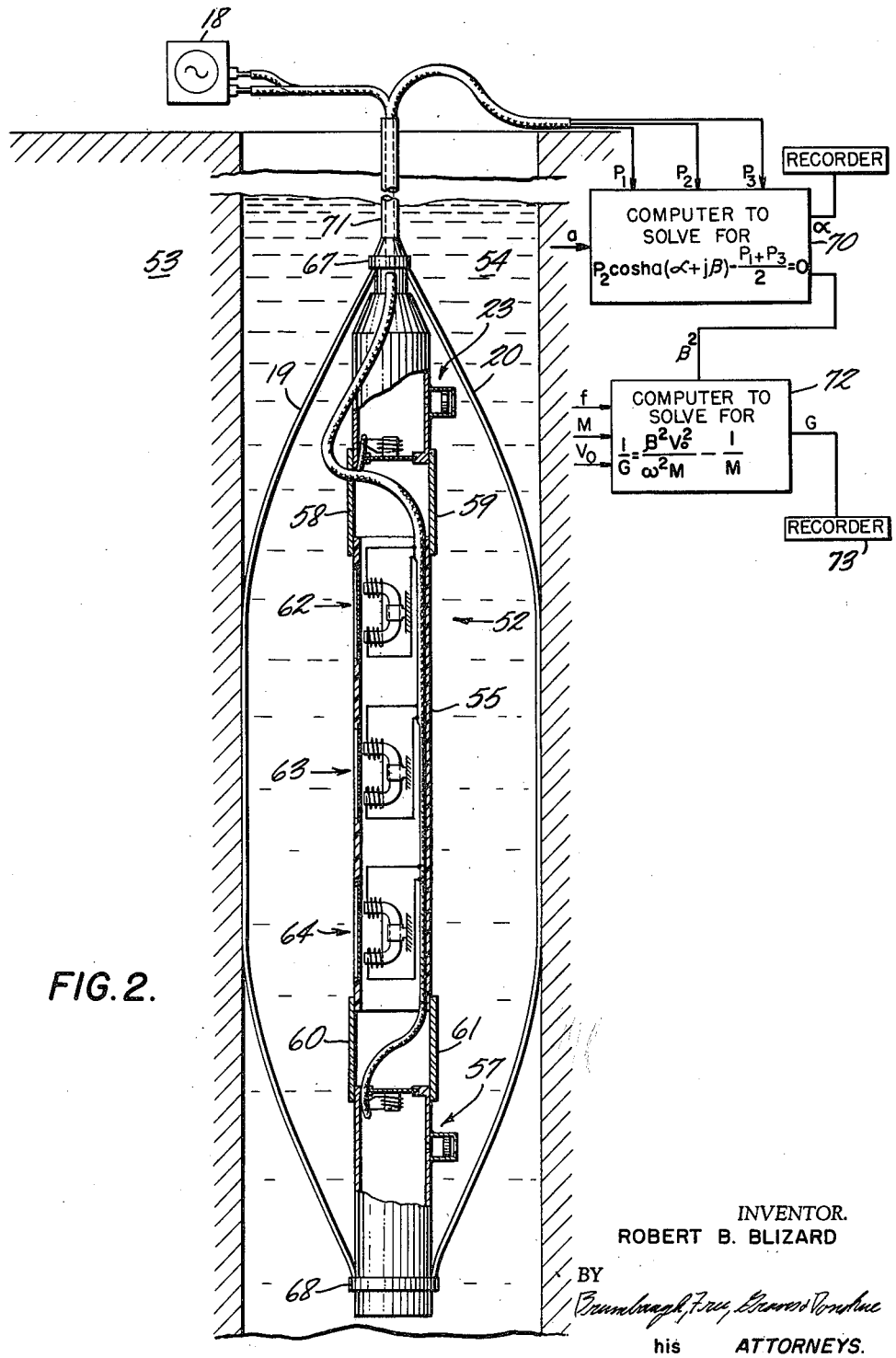

INVENTOR.
ROBERT B. BLIZARD
BY
his ATTORNEYS

United States Patent Office 3,080,010
Patented Mar. 5, 1963

3,080,010
ACOUSTIC WELL LOGGING APPARATUS
Robert B. Blizard, Houston, Tex., assignor to Schlumberger Well Surveying Corporation, Houston, Tex., a corporation of Delaware
Filed Aug. 6, 1959, Ser. No. 832,048
6 Claims. (Cl. 181—0.5)

This invention relates to a method and apparatus for exploring the earth formations traversed by a bore. More particularly, it has to do with new and improved techniques and means for obtaining information about the shear modulus of earth formations traversed by a bore and for detecting the presence of lateral fissures in such formations.

The shear modulus of earth formations is a parameter which is capable of affording much useful information about such formations. It is closely related to a number of factors including the formation porosity, the static pressure due to the overburden, the chemical properties of the formations, and the cementation structure.

The porosity of the earth formations is of importance in that it is a factor in estimating the reservoir capacity of hydrocarbon containing earth formations. The presence of cracks or fissures in hard earth formations which are oil bearing may be important since they allow the oil to seep into the bore which has been drilled into the earth. Therefore, the exact location of horizontal cracks or fissures in the oil bearing zones may be of great commercial importance since their productivity can often be increased by known fracturing techniques.

Therefore, it is an object of this invention to provide a new and improved method and apparatus for obtaining information about the shear modulus of elasticity of the earth formations surrounding a bore.

Another object of this invention is to provide a novel method and apparatus which will detect the presence of fissures in the earth formations surrounding a bore.

A further object of this invention is to provide a new and improved pressure wave generator for use under hydrostatic pressure.

A still further object of this invention is to provide an acoustic well logging method and apparatus of the above character which has response characteristics that are independent of the size of the bore.

Another object of the invention is to provide an acoustic well logging method and apparatus of the above character having response characteristics that are not materially influenced by the earth formations lying above and below the level being logged at any instant.

These and other objects of the invention are attained by disposing in a bore apparatus comprising pressure wave generator means and a plurality of detectors spaced apart longitudinally from each other and from the pressure wave generator means. The plurality of detectors are adapted to detect changes in specified physical characteristics of the fluid contained in the bore which are caused by the pressure field established by the pressure wave generator means and which are indicative of desired physical characteristics of the earth formations surrounding the bore.

In one embodiment of the invention, pressure waves are generated at one location in the bore and indications are obtained of fluid velocity at points spaced apart longitudinally from each other and from said one location, and of fluid pressure at a position between said points. From the indications thus obtained, the shear modulus can be readily determined. It is also possible to ascertain if fissures are present.

According to another embodiment of the invention, pressure waves are generated at one location in a bore and indications of fluid pressure are obtained at a plurality of points spaced apart from each other and from said one location. In this form of the invention, the propagation constant of the pressure waves in the bore is ascertained from the indications of fluid pressure that are obtained at the plurality of points. The shear modulus is then determined (assuming the absence of fissures) from the imaginary part of the propagation constant. The presence of fissures can be detected by large attenuation of the pressure waves as indicated by a large real part of the propagation constant.

The invention may be better understood from the following detailed description of several representative embodiments taken in conjunction with the accompanying drawings in which:

FIGURE 1 is a schematic diagram of typical well logging apparatus, partly in section, constructed according to the invention;

FIGURE 2 illustrates schematically another embodiment, partly in section, of the invention.

Figure 1A:
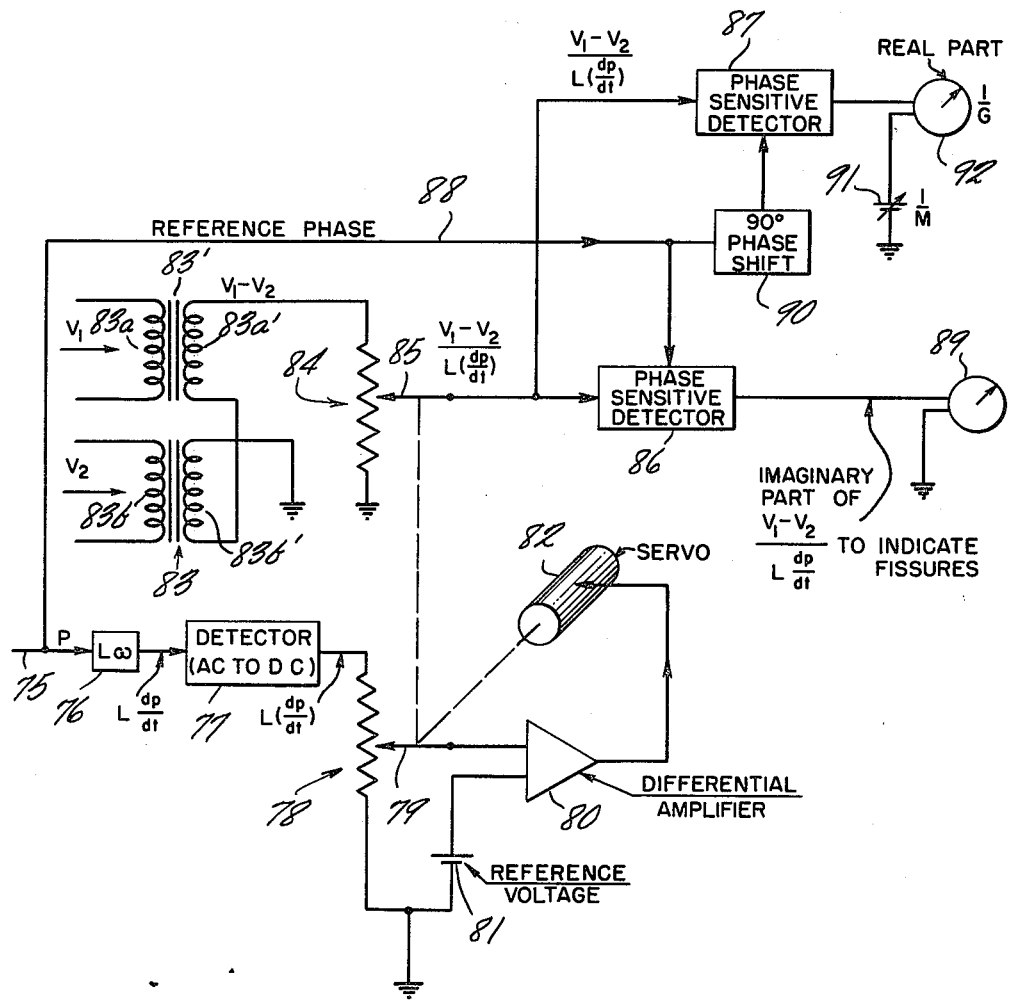
FIGURE 1A is an electrical schematic diagram of the circuit details of an exemplary embodiment of the computer shown in FIG. 1.

With reference to FIGURE 1, a support 10 is lowered into a bore 11 surrounded by earth formations 12 and containing a liquid 13. The support 10 is lowered and raised in the bore by a cable 14 which may be wound on a conventional winch (not shown) at the surface of the ground. At least three bow springs, such as springs 19 and 20, are attached to the extreme ends of the support 10 by collars 21 and 22 and maintain the support at the center of the bore.

The support 10 includes a pressure wave generator 23 which is coupled to a pressure-resistant housing 24 by suitable coupling means such as braces 25 and 26. A plurality of electrical conductors, normally contained within the cable 14 and insulated therefrom, connect a plurality of transducers carried by the housing 24 to a computer 15 and connect the generator 23 to an oscillator 18.

The pressure wave generator 23 comprises a tube 28, which may be made of metal or other rigid material, filled with a fluid 29 and closed at one end by a plate 30 and at the other end by a diaphragm 27 preferably of flexible steel. The fluid 29 filling the tube is preferably a relatively compressible fluid such as silicone oil. The diaphragm is adapted to be driven electromagnetically by a coil 35 connected to the oscillator 18 at the surface of the ground. Preferably, the column of fluid 29 in the tube 28 should resonate at the frequency of the oscillator 18. To this end, the tube should be approximately one-quarter wave length long relative to the wave length of the resonating fluid 29.

To equalize the static pressures on both sides of the diaphragm 27, a small hole 31 is provided in the tube 28 which communicates with a small cylinder 32 in which a piston 33 is slidably mounted. The piston 33 is adapted to be displaced back and forth by changes in the hydrostatic pressure in the bore as the apparatus is raised and lowered therein so that the pressures on the opposite sides of the diaphragm are equalized at all times.

The pressure-resistant housing 24 contains two longitudinally spaced apart fluid velocity detectors 36 and 37 and a fluid pressure detector 38. The fluid velocity detectors 36 and 37 are identical and may be of any suitable type such as that shown in the co-pending application Serial No. 479,043 in the name of Maurice C. Ferre, now Patent No. 2,924,289. Detectors of this type comprise a C-shaped tube 39 having two longitudinally spaced apart openings 40 and 41, communicating with the fluid 13 in the bore. The section 42 of the tube is of a nonmagnetic and electrically insulating material and is positioned between the poles of a permanent magnet 43 fastened to the housing at 44. A ribbon-type diaphragm 45, made of an electrically conductive material, is positioned at the center of the section 42 between the poles of the magnet 43.

The pressure waves in the bore fluid 13 caused by the pressure wave generator 23 create an alternating pressure difference between the two openings 40 and 41. This difference in pressure causes the fluid filling the C-shaped tube 39 to move back and forth between the two openings 40 and 41. The movement of the fluid in the tube causes the diaphragm 45 to vibrate between the poles of the magnet and generates a signal between the two terminals 46 and 47 which is a function of the fluid velocity.

The pressure detector 38 may be of the type disclosed in the United States Patent No. 2,191,120 to Slichter, for example. It comprises a diaphragm 48 which is secured in an opening 38a in the housing 24 in any suitable fluid-tight manner. Within the housing are two coils 50 and 51 which, along with a U-shaped core 49, constitute a magnetic system which will generate a signal when the diaphragm 48 vibrates. The coils 50 and 51 may be polarized with direct current or by a permanent magnet.

The two velocity detectors 36 and 37 and the pressure detector 38 are electrically connected to the computer 15, better illustrated in FIG. 1A, at the surface of the ground. The computer is adapted to determine the shear modulus G of the formations 12 and a recorder 16, connected to the output of the computer, provides a log of G versus depth in the bore.

Before discussing the operation of the apparatus of FIG. 1, it will be helpful to set forth briefly some of the theory on which the applicant's invention is based. It can readily be shown that when the fluid pressure in the bore is changed by an amount of pressure $p$, the volume $V_p$ of the section of the bore in which the change in pressure takes place is given by the relation:

$$V_p = V_0 \left( 1 + \frac{p}{G} \right) \quad (1)$$

where $V_0$ is the volume of the same section of the bore at the initial pressure, and G is the shear modulus of the material comprising the surrounding formation.

In a given section of the bore between, for example, detectors 36 and 37, in addition to changing the volume of the bore, any fluid pressure change inside the bore will also produce a corresponding change in the volume of a given mass of fluid in the bore. Therefore, when the pressure in a section of the bore increases, there will flow into this section a volume of bore fluid equal to the sum of the increase in the volume of the section of the bore and the decrease in the volume of fluid originally in the aforesaid section of the bore. The volume V of the incoming fluid is given by the relation:

$$V = V_0 p \left[ \frac{1}{G} + \frac{1}{M} \right] \quad (2)$$

where M is the volume modulus of the fluid in the bore.

By differentiating Equation 2, the rate of in-flux of fluid into the section between the velocity detectors 36 and 37 is shown to be:

$$\frac{dV}{dt} = V_0 \frac{dp}{dt} \left[ \frac{1}{G} + \frac{1}{M} \right] \quad (3)$$

In the form of the invention shown in FIG. 1, the rate of in-flux, $$\frac{dV}{dt}$$

of the fluid entering the section between the two fluid velocity detectors 36 and 37 as a result of an increase of fluid pressure in the section is given by the relation:

$$\frac{dV}{dt} = A(v_1 - v_2) \quad (4)$$

where $v_1$ and $v_2$ are the fluid velocities indicated by the two fluid velocity detectors 36 and 37 and A is the cross-sectional area of the bore.

In the absence of fissures, the volume of the space occupied by the section of the bore between the two fluid velocity detectors is given by the formula $V_0 = LA$, where L is the distance between the two fluid velocity detectors and A is the cross-sectional area of the bore. Substituting LA for $V_0$ in Equation 3 and then combining Equations 3 and 4, the following relation is obtained for the reciprocal of the shear modulus:

$$\frac{1}{G} = \left[ \frac{1}{L\frac{dp}{dt}} (v_1 - v_2) - \frac{1}{M} \right] \quad (5)$$

It will be apparent, therefore, that the shear modulus G of the formation surrounding the bore at any depth can be ascertained by measuring the values $v_1$, $v_2$ and $p$ at that depth, and introducing these values into a computer, such as computer 15, adapted to determine G according to Equation 5.

If fissures are present between the receivers, a larger volume of fluid will be available for compression in the section of the bore than would otherwise be present so that the shear modulus as computed from Equation 5 will have an abnormally low value as compared to the value expected if no fissures were present. Abnormally low values of the calculated shear modulus, therefore, may be taken as indicating that fissures are present.

While Equation 5 may be solved manually, it is preferred to use computer means for this purpose. An example of a computer found suitable for this purpose is illustrated schematically in FIG. 1A.

A voltage representative of the pressure $p$ is connected by a conductor 75 to a suitable multiplier-differentiator circuit 76 that differentiates the voltage signal $p$, which is varying at an angular frequency $\omega$, as a function of time $(t)$ and multiplies the resultant signal by the factor L to produce a voltage proportional to $$L \frac{dp}{dt}$$

This voltage is converted to a D.C. voltage proportional to $$L \frac{dp}{dt}$$

by a detector 77. A potentiometer 78 has its resistance connected between ground and the output of the detector 77 and its slider 79 connected to a differential amplifier 80. A source of electrical potential 81 is also connected between the amplifier 80 and ground and supplies to the amplifier 80 a reference voltage of say 1 volt, in opposition to the voltage between the slider 79 and ground. The output of the amplifier 80 is connected to drive a servo motor 82 that is mechanicaly coupled to the arm 79 to adjust the position of the latter so as to maintain substantially zero voltage in the input circuit to the amplifier 80.

Voltages representative of the velocities $v_1$ and $v_2$ are connected to the primary windings 83a and 83b of transformers 83 and 83', the secondary windings 83a' and 83b' of which are connected in series opposition to provide an output voltage proportional to $v_1 - v_2$. This voltage is connected across the resistance of a potentiometer 84 having a slider 85 that is mechanically coupled to the slider 79 of the potentiometer 78.

The potentiometers 78 and 84 have the same ohmic resistance R. Since the servo motor 82 continuously adjusts the position of the slider 79 to maintain a reference voltage value of 1 volt between it and ground, in which case $$L \frac{dp}{dt} R = 1 \text{ or } R = \frac{1}{L\frac{dp}{dt}}$$

then the voltage between the arm 85 and ground is equal to $$\frac{v_1-v_2}{L\frac{dp}{dt}}$$

This voltage is connected to two phase sensitive detectors 86 and 87. The detector 86 also receives voltage of a reference phase from the conductor 75 over the conductor 88 and provides an output to a meter 89 to indicate the imaginary part of $$\frac{v_1-v_2}{L\frac{dp}{dt}}$$

The reference voltage from the conductor 88 is shifted 90° in phase by a conventional phase shifting device 90 and supplied as a phase reference voltage to the detector 87. Hence, the output of the detector 87 is proportional to the real part of $$\frac{v_1-v_2}{L\frac{dp}{dt}}$$

This voltage is connected in series opposition with a variable voltage source 91 set to the value of $$\frac{1}{M}$$

and the value of the difference voltage, which is representative of $$\frac{1}{G}=\frac{v_1-v_2}{L\frac{dp}{dt}}-\frac{1}{M}$$

is indicated by a meter 92. The meters 89 and 92 may, of course, be adapted to provide a permanent record of these values.

In the embodiment of the invention shown in FIG. 2, information about the shear modulus of the formations 53 is obtained by creating a fluid pressure field in the bore 54 and obtaining indications of fluid pressure at a plurality of nearby longitudinally spaced apart locations.

The apparatus 52 is lowered into the bore 54 and includes two fluid pressure generators 23 and 57 which are attached to a housing 55 by a plurality of braces 58—61. The apparatus is maintained centered in the bore by at least three springs, such as springs 19 and 20. The housing 55 contains three longitudinally spaced apart fluid pressure detectors 62, 63 and 64 which are electrically connected to computers 70 and 72 at the surface of the ground by conductors usually contained within the supporting cable 71 and insulated therefrom. The coils of the generators 23 and 57 are connected to be driven in synchronism by an oscillator 18.

The two pressure wave generators 23 and 57 are preferably positioned approximately one-half wave length aptrt with the three pressure detectors located symmetrically between them. The distance between the pressure wave generators and the nearest pressure detector is such that only longitudinally traveling waves are present in the region of the detectors. For example, this spacing may be in the neighborhood of at least two bore diameters.

As an aid in understanding the operation of the form of the invention shown in FIG. 2, a brief resumé of the underlying theory is set forth below.

If the earth formations surrounding the bore walls are elastic, the phase velocity of a low frequency pressure wave in the bore will be less than the phase velocity in a bore having rigid walls, and in the presence of fissures, considerable attenuation can be expected. The amount by which the velocity will be decreased is dependent in part upon the shear modulus of the earth formations, and, therefore, in the absence of fissures, the nature of the formations can be determined by obtaining a log of the shear modulus versus depth in the bore.

The shear modulus G can be calculated from the formula:

$$\frac{1}{G}=\frac{\beta^2 v_0^2}{\omega^2 M}-\frac{1}{M} \qquad (6)$$

where M is the adiabatic volume modulus of the bore fluid, $v_0$ is the pressure wave velocity in the bore fluid if the side walls of the bore are assumed to be infinitely rigid, $\omega$ is the angular frequency, and $\beta$ is the phase constant of the pressure waves in the bore. The modulus M can be measured at the surface and the velocity $v_0$ can be determined from the formula:

$$v_0=\sqrt{\frac{M}{\rho}} \qquad (7)$$

where $\rho$ is the density of the bore fluid which can also be measured at the surface. Therefore, if $\beta$, the phase constant of the pressure waves in the bore, can be ascertained, the shear modulus of the earth formations can also be determined.

The phase constant $\beta$ may be calculated when the propagation constant $k$ of the pressure wave is known since they are related by the formula:

$$k=\alpha+j\beta \qquad (8)$$

where $\alpha$ is the real part and represents the attenuation of the wave, and $\beta$ is the imaginary part and represents the phase shift of the wave.

For convenience, the conventional complex notation for harmonically varying parameters may be employed as in the following equation:

$$p(t)=RPe^{j\omega t} \qquad (9)$$

where the pressure $p$, as a function of time ($t$) at a particular point in the bore, is equal to the real part R of a complex pressure amplitude P times the customary exponential expression $e^{j\omega t}$.

In the region between the two pressure wave generators 23 and 57, the complex pressure amplitude P is a function of a distance $x$ measured along the bore from the middle detector 63, and is, in fact, equal to the sum of the two terms representing waves traveling in opposite directions. Thus, the following equation:

$$P(x)=P_+e^{-kx}+P_-e^{kx} \qquad (10)$$

may be written were $P_+$ and $P_-$ are the complex pressure amplitudes for the waves traveling in the positive and the negative directions, respectively. Equation 10 may be solved for the pressure at the middle detector 63 by setting $x$ equal to zero, thus:

$$P_2=P_++P_- \qquad (11)$$

Likewise, to solve for $P_1$ and $P_3$, at the end detectors 62 and 64, $x$ is set equal to $a$ and $-a$, respectively, so that:

$$P_1=P_+e^{-ka}+P_-e^{ka} \qquad (12)$$

and $$P_3=P_+e^{ka}+P_-e^{-ka} \qquad (13)$$

where $a$ is the distance between adjacent pressure detectors.

By combining Equations 12 and 13 and using the relation between hyperbolic and exponential functions, the following relation is obtained:

$$\frac{(P_1+P_3)}{2}=(P_++P_-)\cosh ka \qquad (14)$$

Dividing Equation 14 by Equation 11 and rearranging the terms provides the following relation:

$$\cosh ka=\frac{P_1+P_3}{2P_2} \qquad (15)$$

The complex pressures $P_1$, $P_2$ and $P_3$ are transformed into complex voltages by the three pressure detectors 62, 63 and 64 and the real and the imaginary parts of the propagation constant $k$ are then determined at the surface of the ground, preferably by an electric computer 70 designed to solve Equation 15, and a record is made of the rear part $\alpha$ versus depth. This log indicates the presence of fissures by an abnormally high value of $\alpha$ because the presence of fissures cause high attenuation of the pressure waves. The imaginary part $\beta$ is delivered to a second computer 72 which is designed to solve Equation 6 for the shear modulus G. A log of the shear modulus G versus depth in the absence of fissures is produced by a recorder 73.

Figure 3:
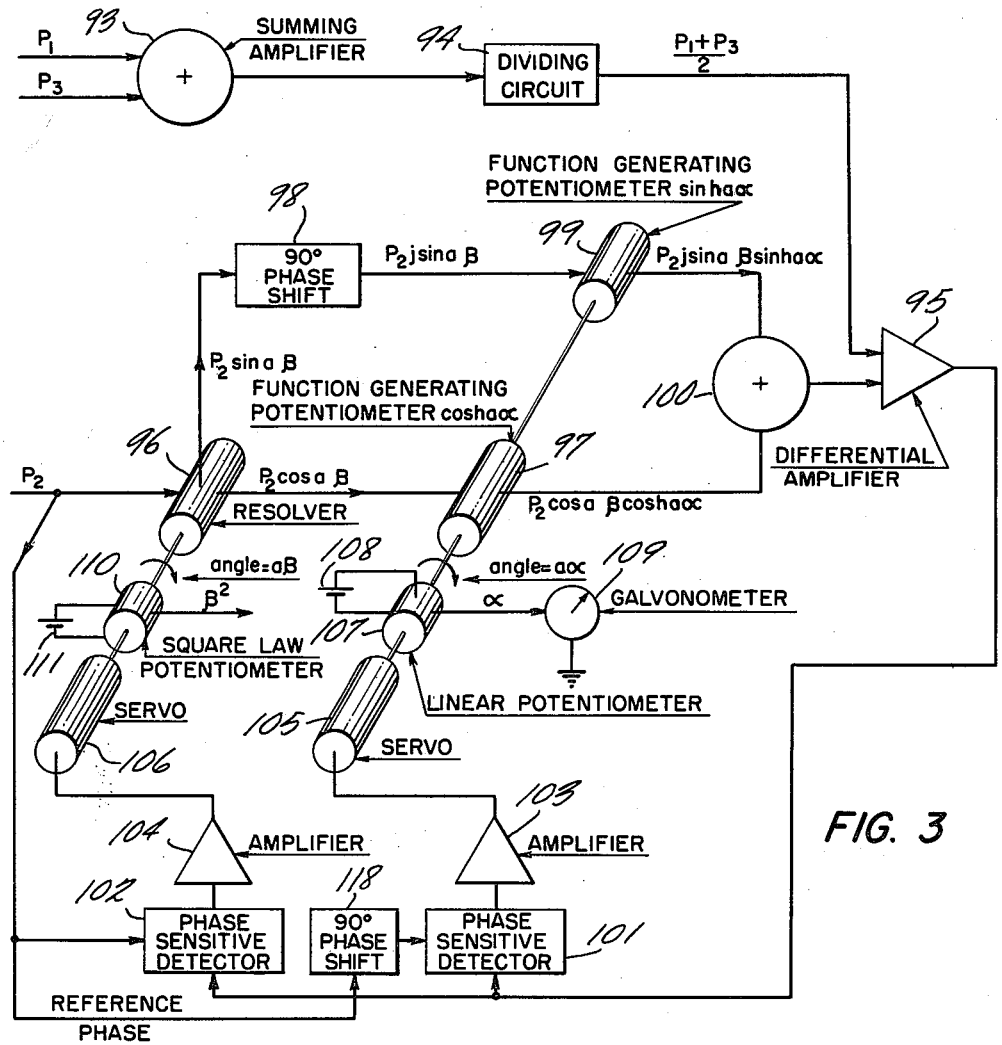
FIGURES 3 and 4 are schematic diagrams of exemplary embodiments of the computers shown in FIG. 2.
Figure 4:
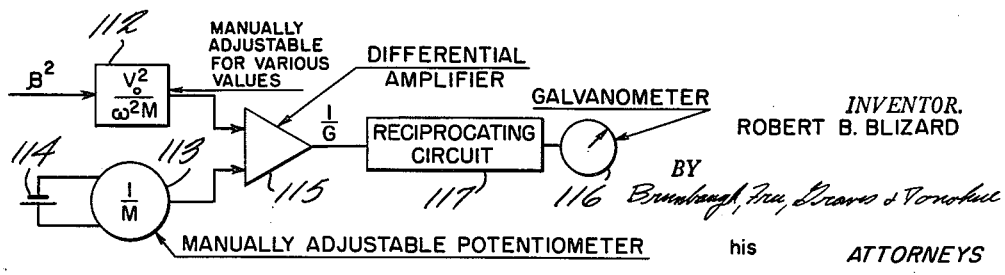

FIGS. 3 and 4 are schematic diagrams of computers designed to solve Equations 6 and 15 for $\alpha$, $\beta$ and G using the apparatus shown in FIG. 2. With reference to FIG. 3, the voltages representing the pressures $P_1$ and $P_3$ are added together by a summing amplifier circuit 93 and the sum of the voltages is divided by two by a dividing circuit 94. The resulting voltage, proportional to the quantity $$\frac{P_1 + P_3}{2}$$

is fed into a differential amplifier circuit 95.

A voltage representing the pressure $P_2$ is connected to the winding of a conventional resolver 96 that has its rotor set (as will be seen) to the angle $a\beta$. The output voltage representing the quantity $P_2 \cos a\beta$ from the resolver 96 is connected to a function generating potentiometer 97 that mulipies the input voltage by the quantity $\cosh a\alpha$. Thus, its output is proportional to the quantity $P_2 \cos a\beta \cosh a\alpha$ which is fed into an adding circuit 100. The output voltage representing $P_2 \sin a\beta$ from the resolver 96 is shifted 90° in phase by a conventional phase shifting circuit 98 which is connected to a potentiometer 99 that multiplies the output of circuit 98 by $\sinh a\alpha$. The voltage output representing the quantity $P_2 j \sin a\beta \sinh a\alpha$ from the potentiometer 99 is also fed into the adding circuit 100.

The sum of the two voltages entering the adding circuit 100 is equal to $P_2 \cos a\beta \cosh a\alpha + P_2 j \sin a\beta \sinh a\alpha$ which is trigonometrically identical to $P_2 \cosh a(\alpha + j\beta)$. The quantity $\cosh(\alpha + j\beta)$ will be recognized as the left side of the Equation 15 when it is recalled that $k = (\alpha + j\beta)$. The output of the adding circuit 100 is fed into the amplifier 95 along with the output from the dividing circuit 94. It can be seen that the two inputs to the amplifier 95 represent the two sides of the Equation 15.

The output from the amplifier 95 is connected to the two phase sensitive detectors 101 and 102. The output of the detector 102 is a signal whose amplitude is proportional to that of the output of amplifier 95 which is 90° out of phase with the pressure $P_2$. The output of the detector 102 is a signal whose amplitude is proportional to that of the output of amplifier 95 which is made 90° out of phase with the pressure $P_2$ by a 90° phase shifting network 118. The outputs of detectors 101 and 102 are amplified by two amplifiers 103 and 104 and drive two servo motors 105 and 106. The servo motor 105 is connected to drive the two potentiometers 97 and 99, and the servo motor 106 drives the resolver 96. It can be seen that a phase difference between the output voltage of the amplifier 95 and the input voltage representing the pressure $P_2$ will adjust the setting of the resolver and the potentiometers 97 and 99 until the unbalance is corrected. The rotor angle of the servo motor 105 represents the angle $a\alpha$ and the rotor angle of the servo motor 106 represents the angle $a\beta$. A linear potentiometer 107 is coupled to the rotor of the servo motor 105 and, with the voltage source 108, produces a voltage representative of the quantity $\alpha$ which is indicated by a galvanometer 109. Since the quantity $\beta^2$ is required in a subsequent computation, a square law potentiometer 110 is connected to the rotor of the servo motor 106 and, along with a voltage source 111, produces a voltage representative of the quantity $\beta^2$.

The voltage representing the quantity $\beta^2$ is employed by the computer illustrated in FIG. 4 to determine the shear modulus G of the earth formations according to the Equation 6. This voltage is fed into a manually adjustable circuit 112 that multiplies the input voltage by the quantity $$\frac{v_0^2}{\omega^2 M}$$

where $v_0$ is the pressure wave velocity in a bore with rigid walls, $\omega$ is the angular frequency and M is the adiabatic volume modulus. A manually adjustable potentiometer 113 and a voltage source 114 produce a voltage proportional to the quantity $$\frac{1}{M}$$

which is fed into a differential amplifier 115 along with the voltage output from the circuit 112. The output voltage from the amplifier 115 is proportional to the quantity $$\frac{\beta^2 v_0^2}{\omega^2 M} - \frac{1}{M}$$

which, according to Equation 6, is equal to $$\frac{1}{G}$$

The reciprocal of this quantity is given at the output of the inverting circuit 117 and is indicated on a galvanometer 116. The output of the amplifier 115 could, if desired, be connected directly to an indicator to indicate the value of $$\frac{1}{G}$$

The indicators 109 and 116, FIGS. 3 and 4, could of course be adapted to provide a permanent record.

If a detailed log of the shear modulus versus the depth is to be obtained, the phase velocity of the pressure waves must be determined over a short interval. Also, a wave length of at least 5 and preferably 10 times the maximum bore diameter is desirable so that the pressure wave velocity will be independent of the bore diameter. To satisfy these requirements, the phase velocity must be measured over a distance which is substantially smaller than a wave length.

One pressure wave generator may be used instead of two. However, if one generator is used, the two pressures $P_1$ and $P_3$, which must be averaged in order to compute $k$, will generally be out of phase. If the phase difference is in the neighborhood of 180°, the difficult task of finding a small difference between two large quantities is faced. By providing two generators symmetrically disposed above and below the receivers, the pressures $P_1$ and $P_3$ will be nearly in phase and nearly equal. Furthermore, if the two generators are spaced one-half wave length apart and are driven in synchronism, their fields will nearly cancel both above and below the transmitters so that little sound will be reflected from the discontinuities in the bore. Also, the pressure wave pattern will be symmetrical about the center of the detectors. A further advantage of the half-wave separation of the two generators is that the power radiated up and down the bore will be greatly reduced, thus reducing the power requirements of the generators.

It can be seen, therefore, that a novel and useful well logging apparatus has been provided which enables much useful information to be obtained about the shear modulus of the earth formations surrounding the bore and about fissures that may be present in the earth formations. With the well logging apparatus described above, readings can be obtained which are independent of the bore diameter and which are not affected by discontinuities in the bore either above or below the detecting apparatus.

While particular embodiments of the present invention have been shown and described for purposes of illustration, it is apparent that changes and modifications may be made without departing from this invention in its broader aspects. Therefore, the invention described herein is not to be construed as limited to the specific embodiments described but is intended to encompass all modifications thereof coming within the scope of the followings claims.

I claim:

1. Apparatus for exploring earth formations traversed by a bore comprising a support adapted to be lowered into said bore, pressure wave generator means carried by said support, a plurality of wave detectors also carried by said support in longitudinally spaced apart relation to each other and to said generator means, at least one of said plurality of wave detectors comprising a pressure detector and at least two of said plurality of wave detectors comprising fluid velocity detectors, at least one of said pressure detectors being mounted between said fluid velocity detectors, and computing means jointly coupled to said detectors providing a signal representative of the shear modulus of the earth formations surrounding said bore.

2. Apparatus for exploring earth formations traversed by a bore as in claim 1 wherein said detectors are adapted to provide signals representative of the fluid pressure and fluid velocity, respectively, said means coupled to said detectors comprises a computer arranged to receive and combine said signals to provide a voltage output signal proportional to shear modulus, in accordance with the equation:

$$\frac{1}{G} = \frac{1}{L\frac{dp}{dt}}(v_1 - v_2) - \frac{1}{M}$$

where G is the shear modulus, L is the distance between said two fluid velocity detectors, $p$ is the pressure in said bore, $v_1$ and $v_2$ are the inward velocities of a fluid filling said bore as measured by said two fluid velocity detectors and M is the volume modulus of said fluid filling said bore.

3. Apparatus for exploring earth formations traversed by a bore as in claim 2 wherein said computer comprises first input means responsive to the signal from said pressure detector for converting the same to a first voltage output which represents the time rate of change of said pressure multiplied by the distance between said fluid velocity detectors, means responsive to said first voltage output for converting said first voltage output to a D.C. voltage, a first potentiometer having a resistance and a slider, said D.C. voltage being impressed across the resistance of said potentiometer, means connected to the slider of said potentiometer for maintaining the voltage on said slider at a reference value, second and third input means responsive, respectively, to said two fluid velocity detectors for providing a voltage output representing the difference between the responses of said two detectors, a second potentiometer having a resistance connected to receive said difference output and a slider, means connecting the sliders of said first and second potentiometers for movement as a unit, means electrically connected to said second potentiometer slider to receive the voltage output of said second potentiometer for indicating the real part of the voltage at the slider of said second potentiometer, and means electrically connected to said second potentiometer slider to receive the voltage output of said second potentiometer for indicating the imaginary part of the voltage at the slider of said second potentiometer.

4. Apparatus for exploring earth formations traversed by a bore, comprising a support adapted to be lowered into said bore, a pressure wave generator means carried by said support for generating a pressure wave in said bore, a pressure detector carried by said support and spaced apart from said generator means longitudinally relative to said bore, first and second fluid velocity detectors in fixed spaced-apart relation to and on opposite sides of said pressure detector and also in fixed spaced-apart relation to said wave generator means but to one side thereof, each of said detectors being capable of providing respective signals representative of the characteristic of said pressure wave to which it is responsive, and computing means receiving and combining said signals to provide a signal representative of the shear modulus of the earth formations adjacent said apparatus.

5. Apparatus for exploring earth formations traversed by a bore, comprising a support adapted to be lowered into said bore, a pressure wave generator means carried by said support arranged to produce a pressure wave in said bore, a pressure detector carried by said support and spaced apart from said generator means longitudinally relative to said bore, first and second fluid velocity detectors spaced longitudinally on opposite sides of said pressure detector in fixed spaced-apart relation thereto and also in fixed spaced-apart relation to said wave generator means but to one side thereof, each of said detectors being capable of providing respective signals representative of the characteristic of said pressure wave to which it is responsive, and means for receiving and combining said signals whereby the quantities represented by the signals from said fluid velocity detectors are combined and divided by the quantity represented by the signal from said pressure detector to provide a signal representative of the shear modulus of the earth formations adjacent said apparatus.

6. A method for exploring earth formations traversed by a bore containing a fluid medium, comprising the steps of inducing a pressure wave in the medium at a first location in the bore, obtaining an indication of a pressure characteristic of the pressure wave in the bore at a second location spaced in a longitudinal direction along the bore and from said first location, obtaining simultaneously therewith indications of fluid velocity characteristics of the pressure wave in the bore at third and fourth locations spaced in a longitudinal direction along the bore from said first location and in the same direction as said second location, said third and foutrh locations being on opposite sides of said second location and spaced longitudinally therefrom and combining said indications to provide a signal representative of the shear modulus of the earth formations adjacent said locations.

References Cited in the file of this patent

UNITED STATES PATENTS

| | | |
|---|---|---|
| 2,190,686 | Slichter | Feb. 20, 1940 |
| 2,784,796 | Overton | Mar. 12, 1957 |
| 2,865,463 | Itria | Dec. 23, 1958 |
| 2,924,289 | Ferre | Feb. 9, 1960 |